United States Patent
Yabutani et al.

[11] 3,907,995
[45] Sept. 23, 1975

[54] MITICIDAL COMPOSITION

[75] Inventors: Kunihiro Yabutani, Kadoma; Zitsuichi Kishikawa, Takatsuki, both of Japan

[73] Assignee: Nihon Nohyaku Co. Ltd., Tokyo, Japan

[22] Filed: Aug. 27, 1973

[21] Appl. No.: 391,125

[30] Foreign Application Priority Data
Sept. 1, 1972 Japan................................ 47-87116
Sept. 13, 1972 Japan.............................. 47-92004

[52] U.S. Cl. ............................................... 424/251
[51] Int. Cl.² ...................... A01N 9/00; A01N 9/22
[58] Field of Search .................................. 424/251

[56] References Cited
UNITED STATES PATENTS
| | | | |
|---|---|---|---|
| 2,915,521 | 12/1959 | Laubach et al. | 424/251 |
| 3,162,634 | 12/1964 | Klosa | 424/251 |
| 3,515,787 | 6/1970 | Breuer et al. | 424/251 |
| 3,755,581 | 8/1973 | Janiak | 424/251 |

FOREIGN PATENTS OR APPLICATIONS
| | | |
|---|---|---|
| 931,019 | 7/1963 | United Kingdom |
| 1,111,433 | 4/1968 | United Kingdom |

OTHER PUBLICATIONS
Chem. Abst. 63, 8377 (d–h) (1965), Starke, 4-Quinazolinone derivatives.

Primary Examiner—Albert T. Meyers
Assistant Examiner—Douglas W. Robinson
Attorney, Agent, or Firm—Brisebois & Kruger

[57] ABSTRACT

A miticidal composition comprising as an active ingredient a compound expressed by the general formula:

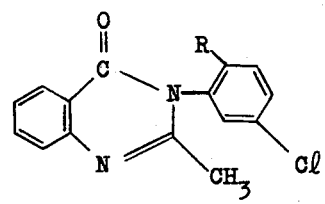

wherein R is methyl or ethyl radical, and an inert carrier. The compounds expressed by the above general formula are especially useful as an ovicide of various mite pests such as rust mite, red mite, spider mite, two-spotted spider mite and the like and are applied in a form of agricultural pesticidal preparation such as dust, wettable powder, emulsion or the like.

5 Claims, No Drawings

MITICIDAL COMPOSITION

DETAILED EXPLANATION OF THE INVENTION

The present invention relates to a miticidal composition.

The object of the present invention is to provide a miticidal composition containing as the active ingredient a compound expressed by the following general formula:

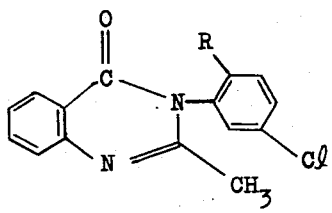

wherein R represents a methyl or ethyl radical.

Another object of the present invention is to provide a method for controlling mite pests, which comprises applying a compound of the above-mentioned general formula.

The quinazolinone compound has so far been studied occasionally as a soporific or tranquilizer for medical purposes.

The present inventors, while investigating the bioactivity of quinazolinone compound as an agricultural chemical, happened to know that a compound expressed by the above-mentioned general formula is highly miticidal to mite pests. Said compound of the above-mentioned formula is remarkably effective for killing sensitive or resistant mite pests, notably in their egg stages.

A compound of the above-mentioned general formula can be synthesized by reacting, for example, N-acetylanthranilic acid with 2-methyl-5-chloroaniline or 2-ethyl-5-chloroaniline in the presence of a condensing agent. This reaction can illustratively be expressed as follows:

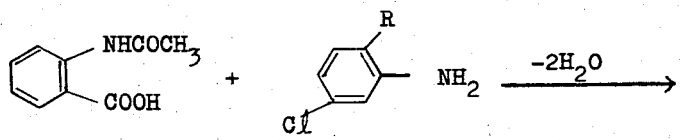

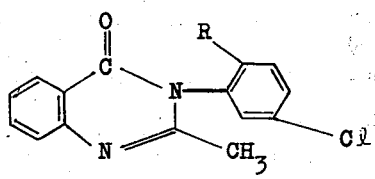

wherein R represents a methyl or ethyl radical.

Generally, this reaction can take place between one mol of the aniline and the same amount or a slight excess of N-acetylanthranilic acid in an appropriate inert solvent in the presence of 0.5 ~ 1.0 mol of a condensing agent. The reacting temperature may be adequately selected in the range of 30° ~ 200°C, but it would usually be more advantageous to make the reaction take place at the boiling point of the solvent. Inert solvents available for this purpose include toluene, xylene, dioxane; and condensing agents available include phosphorus oxychloride, phosphorus trichloride, thionyl chloride, phosgene, but without limitation thereto.

The quinazolinone compound of the above-mentioned general formula may also be synthesized by the following method. Namely, it can be obtained by reaction of anthranilic acid anilide with N,N-di-lower alkyl acetamide in the presence of an acidic condensing agent, followed by treatment with alkali. In the event of using phosphorus oxychloride as an acidic condensing agent, the reaction is to be illustratively expressed as follows:

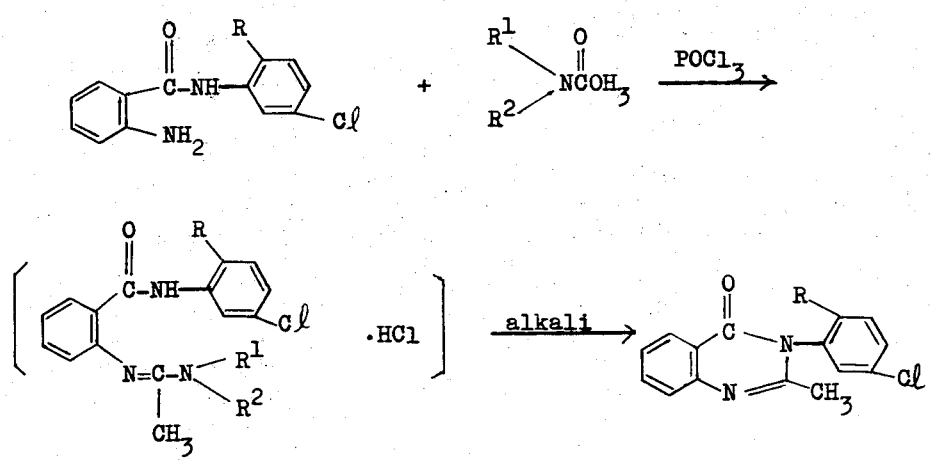

wherein R represents a methyl or ethyl radical; $R^1$, $R^2$ represent lower alkyl radicals.

Anthranilic acid-substituted anilide, one of the materials in the present invention, can be easily synthesized by a method in the prior art, for instance by reacting isatoic acid anhydride with substituted aniline or reacting anthranilic acid ester with substituted aniline.

The acidic condensing agents available for this method include for instance; phosphorus halides such as phosphorus trichloride, phosphorus pentachloride, phosphorus pentabromide, phosphorus oxychloride, phosphorus oxybromide, thionyl chloride, thionyl bromide, surfuryl chloride, chlorosulfonic acid; oxygen acid halides of phosphorus or sulfur; organic sulfonic acid halides such as benzene sulfonic acid chloride; and carboxylic acid halides such as phosgene, acetylchloride, benzoylchloride. Among others, the more preferable acidic condensing agents are phosphorus trichloride, phosphorus oxychloride, thionyl chloride and phosgene; these condensing agents are to a certain extent equivalent to the acidic condensing agents employed routinely in Vilsmeier's aldehyde synthesis.

The intermediate product resulting from reaction of anthranilic acid anilide with Vilsmeier's reagent is treated with alkali. Suitable alkalis for this purpose are inorganic bases such as caustic alkali, carbonate or ammonia; these are to be used as an aqueous solution.

Organic bases are also available for the purpose. Reaction takes place without a solvent or in an appropriate inert solvent such as benzene or toluene. In this case, it is of course permissible to use the reactant, i.e., N,N-di-lower alkyl substituted acetamide in excess of the theoretical dose, thereby making it serve concurrently as the solvent.

The reaction mole ratio may be appropriately selected in the range of 1 ~ 5 mols of N,N-di-lower alkyl substituted acetamide and 0.5 ~ 1 mol of acidic condensing agent against one mol of anthranilic acid-substituted anilide.

The first step in the reaction can easily take place at low temperatures, say, −10°C ~ room temperature, but in order to promote the reaction the reacting temperature may be gradually raised up to the range of 30° ~ 80°C. The reaction completes itself in 0.5 ~ 2 hours. By treating the yielded solid (intermediate product) with alkaline water, for instance, aqueous solution of caustic alkali or sodium carbonate or ammonia water, the end product is obtained in the solvent. When no solvent is employed in the first step of reaction, it will be better to put the adduct to alkaline treatment in the presence of a solvent for extraction of the end product, such as ether or benzene.

The quinazolinone compound according to the present invention is notably useful as an ovicide to various mite pests such as rust mite, red mite, spider mite or two-spotted spider mite.

The quinazolinone compound according to the present invention can be prepared by the prior art as a miticidal composition. The quinazolinone compound according to the present invention is prepared as emulsifiable concentrate, wettable powder, dust, granule, paste, oil or aerosol by dispersing, dissolving or adsorbing it in an appropriate inert carrier or thereon with use of one or more than two of the known adjuvants commonly applied in this field or with use of none.

The concentration of the quinazolinone compound in the miticidal composition may normally be from 1 to 10% by weight in the case of dust or granule, and from 10 to 90% by weight in the case of emulsifiable concentrate or wettable powder, based on the total weight of the composition, although the amount of the active ingredient employed will largely depend on various factors.

As to the inert carrier employed in the miticidal composition of this invention, a solid carrier or liquid carrier may be employed as required. The suitable solid carriers for use in this invention include, for example, vegetable powders such as soya bean powder, wood powder, tobacco powder, and walnut powder; and mineral powders such as talc, clay, bentonite, and diatomaceous earth. The liquid carriers for use in this invention are for example, general organic solvents including alcohols such as methanol, ethanol, and glycol; ketones such as acetone, methyl ethyl ketone, and cyclohexanone; ethers such as dioxane, ethylene glycol ether; aliphatic hydrocarbons; aromatic hydrocarbons such as benzene, toluene, xylene, solvent naphtha, and methylnaphthalene; lower aliphatic acid esters; lower aliphatic acid amides such as dimethylformamide, dimethylacetamide, halogenated hydrocarbons; dimethylsulfoxide. Suitable adjuvants include, for example, non-ionic, cationic and anionic surface active agents including polyoxyethylene alkylaryl ether, alkylaryl polyethylene glycol, alkylaryl sulfonate, higher alcohol sulfuric acid ester, alkyl dimethylbenzyl ammonium halide; lignin sulfonic acid salt; stearic acid salt; polyvinyl alcohol; CMC; gum arabic; without limitation thereto.

The method for controlling mite pests according to the present invention comprises contacting said pests with a miticidally effective amount of the active compound or the active ingredient of the formula. The active compound is, of course, to be applied in such an amount sufficient to exert the desired miticidal effect, usually in a dose rate of 50 ~ 500 g/10 ares, preferably 100 ~ 300 g/10 ares for emulsifiable concentrates and wettable powders, and in a dose rate of 50 ~ 600 g/10 ares, preferably 150 ~ 500 g/10 ares for dusts, although the amount of the active ingredient to be employed varies largely depending on such various factors as number of mite pests, condition of weather, kind of mite pests, method of treatment and form of preparation.

The miticidal composition according to the present invention can be used in combination with any other miticide, insecticide or fungicide.

The miticidal composition available for this purpose is preferably selected from among laevicides or adulticides, but hereby combination with an ovicide is not excluded.

EXAMPLE 1

2-methyl-3-(2-ethyl-5-chlorophenyl)-4-quinazolinone

N-acetylanthranilic acid 17.9 g (0.1 mol) and 2-ethyl-5-chloraniline 15.7 g (0.1 mol) were dissolved in dioxane 100 ml and thereto phosphorus oxychloride 7.5 g (0.05 mol) was dripped. The mixture was heated and refluxed for two hours while being agitated. After cooling, the reacting mixture was stirred together with 300 ml of 10% aqueous solution of sodium carbonate.

The product was extracted by means of benzene, washed with water, dehydrated; and then the solvent was removed through distillation under reduced pressure. The residue was recrystallized in a mixed solvent of ethanol and petroleum ether, the yield being 26.1 g and the ratio of yield 87%, and the melting point being 100° ~ 102°C.

2-methyl-3-(2-ethyl-5-chlorophenyl)-4-quinazolinone thus obtained is a novel compound useful as a miticide; as compared with, say, 2-methyl-3-(0-ethylphenyl)-4-quinazolinone which is a substance akin to it, this compound is effective to mites which have developed resistance to the other miticides and is characterized by marked persistence of its miticidal effect. For example, this compound in as low concentration as 62.5 ppm can annihilate the eggs of citrus red mites which are resistant to organic phosphorus preparation, whereas the ovicidal activity of the above-mentioned related compound is a mere 50 ~ 60%.

Meanwhile the test shows that the residual effect is so strong that even after 40 days of treatment, this compound can remain highly miticidal. Thereby the survival number of mites after 40 days of treatment was 1 in the treated plot and 1021 in the non-treated plot of mites, against 40 in the case of treatment with said related compound (survival number of mites is the sum for three reduplications).

Notes:
1. Test procedure is described under Example 4.
2. The test for evaluating the residual effect was performed as follows:

Using a turntable, the test composition prepared according to Example 6 was amply sprayed, as a dilution (containing 250 ppm of active ingredient), on grape fruits in pots. 24 hours thereafter, adults of citrus red mites, 10 males and females each per pot, were inoculated; and every day, the survivals of females on the leaves were counted and compared with their number in the non-treated plot. Testing was done on a three reduplications.

EXAMPLE 2

2-methyl-3-(5-chloro-2-tolyl)-4-quinazolinone

Anthranilic acid 5-chloro-2-toluide 2.6 g (0.01 mol) and N,N-diethylacetamide 5.8 g (0.05 mol) and toluene 10 ml were cooled to −10° ~ 0°C; and thereto was gradually dripped phosphorus oxychloride 0.8 g (0.0055 mol) at a reacting temperature of less than 10°C. Toluene 20 ml was then added and slowly the temperature was elevated to 60°C and the mixture was stirred for 30 minutes. After addition of 100 ml of 10% aqueous solution of caustic soda followed by 30 minutes of stirring, the toluene layer was separated, washed and dehydrated; then toluene was removed through distillation under reduced pressure, the residue being recrystallized out of ethanol. The yield was 2.7 g (the ratio 96%) and the melting point was 148°C.

EXAMPLE 3

2-methyl-3-(2-ethyl-5-chlorophenyl)-4-quinazolinone

Anthranilic acid-2-ethyl-5-chloranilide 2.7 g (0.01 mol), N,N-dimethylacetamide 4.5 g (0.05 mol) and toluene 10 ml were cooled to −10° ~0°C; and thereto was slowly dripped 15 ml of toluene solution which had absorbed phosgene 1g with such precaution that the reacting temperature might not exceed 10°C. Soon the stirring became difficult on account of precipitated crystals. Then toluene 20 ml was added; the mixture was stirred for one hour at room temperature; 100 ml of 10% aqueous solution of sodium carbonate was added; and again the mixture was stirred for 30 minutes. The toluene layer was separated, washed with water, dehydrated; and then toluene was removed through distillation under reduced pressure, the residue being recrystallized out of ethanol. The yield was 2.8 g (the ratio 93%) and the melting point was 100° ~ 102°C.

EXAMPLE 4

Fifty parts of 2-methyl-3-(5-chloro-2-tolyl)-4-quinazolinone (by weight) and 20 parts of polyoxyethylene-alkylarylether were evenly dissolved in 30 parts of xylene to make an emulsion. Said emulsion diluted to a concentration of 250 ppm of active ingredient was sprayed on *Panonychus Citri* (citrus red mite) which was resistant to organic phosphorus preparation and thereby a 100% ovicidal effect was achieved. Likewise, 2-methyl-3-(2-ethyl-5-chlorophenyl)-4-quinazolinone also proved 100% ovicidal.

Note: Test procedure

Grapefruit leaves were placed on three pieces of paper whose one tip was immersed in water; 20 citrus red mites were inoculated thereon. After 24 hours, a solution of test composition (containing 250 ppm of active ingredient) was sprayed thereon at a rate of 12 $\mu$l/cm$^2$. After 10 days of storage in a thermostat room of 25°C, the hatched rate of eggs was counted to determine the ovicidal activity. The test was done on a three reduplications.

EXAMPLE 5

Using the same prescription of the emulsion and taking French bean leaves as the host, the ovicidal effect on two-spotted spider mites (*Tetranychus Urticae*) was investigated in the same way as in Example 4 and thereby 2-methyl-3-(5-chloro-2-tolyl)-4-quinazolinone and 2-methyl-3-(5-chloro-2-ethylphenyl)-4-quinazolinone proved to be 100% ovicidal at 500 ppm.

EXAMPLE 6

Fifty parts of 2-methyl-3-(5chloro-2-ethyl-phenyl)-4-quinazolinone, one part of polyvinylalcohol, and five parts of polyoxyethylenealkylarylether were evenly mixed with 44 parts of diatomaceous earth and then crushed to make a wettable powder preparation. For the purpose of controlling mite pests, this preparation was suspended in an adequate volume of water and applied in an effective amount on the leaves of a plant to be protected from attack by mite pests.

EXAMPLE 7

Four parts of 2-methyl-3-(5-chloro-2-tolyl)-4-quinazolinone was evenly mixed with 96 parts of clay to make a dust preparation, effective amounts of which were sprayed on the leaves of a plant to be protected from attack by mite pests.

What is claimed is:
1. A method of killing mites and their eggs, which comprises applying to the mites miticidally effective amount of a compound having the general formula:

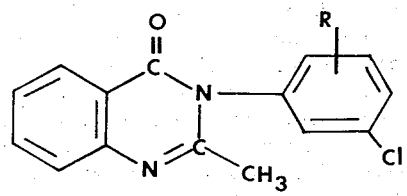

in which R represents methyl or ethyl.

2. The process of claim 1 in which said composition is applied in a dose rate of the active ingredient of about 50 to 600 grams per 10 ares.

3. The process of claim 1 in which said mites are rust mites, red mites, spider mites, or two-spotted spider mites.

4. A method of protecting living plants from attack by mites comprising applying to the foliage of said plants a miticidally effective amount of a compound having the general formula:

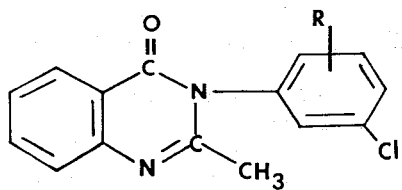

in which R represents methyl or ethyl.

5. The process of claim 4, in which said plants are grapefruits.

* * * * *